(12) United States Patent
Muthuraman et al.

(10) Patent No.: US 11,650,327 B2
(45) Date of Patent: May 16, 2023

(54) ANTENNA PHASE CENTER COMPENSATION FOR ORBITAL ASSISTANCE DATA

(71) Applicant: QUALCOMM Incorporated, San Diego, CA (US)

(72) Inventors: Kannan Muthuraman, Mission Viejo, CA (US); Zoltan Biacs, San Mateo, CA (US); Ning Luo, Cupertino, CA (US); Ronald Blumstein, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/100,648

(22) Filed: Nov. 20, 2020

(65) Prior Publication Data

US 2022/0163677 A1 May 26, 2022

(51) Int. Cl.
*G01S 19/23* (2010.01)
*G01S 19/07* (2010.01)
*G01S 19/04* (2010.01)

(52) U.S. Cl.
CPC ............ *G01S 19/235* (2013.01); *G01S 19/04* (2013.01); *G01S 19/071* (2019.08)

(58) Field of Classification Search
CPC ....... G01S 19/235; G01S 19/071; G01S 19/04
USPC .................................................. 342/352, 368
See application file for complete search history.

(56) References Cited

U.S. PATENT DOCUMENTS

| 8,767,815 | B2* | 7/2014 | Malaga | H04L 7/042 |
| | | | | 375/240 |
| 9,891,325 | B2* | 2/2018 | Milyutin | G01S 19/43 |
| 2012/0182184 | A1* | 7/2012 | Benavides | H01Q 3/267 |
| | | | | 342/368 |

FOREIGN PATENT DOCUMENTS

CN 105044733 A 11/2015

OTHER PUBLICATIONS

International Search Report and Written Opinion—PCT/US2021/052215—ISA/EPO—dated Apr. 11, 2022.
(Continued)

*Primary Examiner* — Bo Fan
(74) *Attorney, Agent, or Firm* — Qualcomm Incorporated

(57) ABSTRACT

A method, apparatus, and system are disclosed for providing modified orbital assistance data to a mobile station to determine its location using global navigation satellite system (GNSS). The modified orbital assistance data may include predicted orbital information for the GNSS satellites combined with antenna phase center offset data for one or more GNSS satellites. The antenna phase center offset data may indicate an offset distance from the center of mass of the GNSS satellite to a position on an antenna of the respective GNSS satellite. The modified orbital assistance data may be in an earth-centered earth-fixed (ECEF) frame of reference and the antenna phase center offset data may be in a body-centered frame of reference.

28 Claims, 7 Drawing Sheets

(56) References Cited

OTHER PUBLICATIONS

Jaggi A., et al., "Phase Center Modeling for LEO GPS Receiver Antennas and its Impact on Precise Orbit Determination", Journal of Geodesy, Continuation of Bulletin Geodesique and Manuscripta Geodaetica, Springer, Berlin, DE, vol. 83, No. 12, Jul. 29, 2009 (Jul. 29, 2009), pp. 1145-1162, XP019756094, ISSN: 1432-1394, DOI: 10.1007/S00190-009-0333-2 the whole document.

Tessier Q., et al., "Modeling the Range and Position Error after EGNOS Orbit and Clock Corrections", GNSS 2017—Proceedings of the 30th International Technical Meeting of the Satellite Division of the Institute of Navigation (ION GNSS+ 2017), the Institute of Navigation, 8551 Rixlew Lane Suite 360 Manassas, VA 20109, USA, Sep. 29, 2017 (Sep. 29, 2017), pp. 2172-2190, XP056014538, the whole document.

* cited by examiner

ANTENNA PHASE CENTER COMPENSATION FOR ORBITAL ASSISTANCE DATA

BACKGROUND OF THE DISCLOSURE

1. Field of the Disclosure

Aspects of the disclosure relate generally to global navigation satellite systems and the like.

2. Description of the Related Art

Global navigation satellite systems (GNSS) are used to determine a global position and/or location of any number of mobile stations. A GNSS may include a constellation of orbiting satellites that each transmit a time-synchronized signal. A mobile station may receive the time-synchronized signal from a number of GNSS satellites. By determining a time of transmission associated with each received time-synchronized signal and having knowledge of the location of each of the satellites that transmitted each received time-synchronized signal, the mobile station may determine its global location. The typical resolution of GNSS systems is typically in the range of two to three meters, however, a more accurate location determination is desired.

SUMMARY

A mobile station functioning in a GNSS may receive modified orbital assistance data from a location assistance server to aid in determining the location and/or position of the mobile station. The modified orbital assistance data may include predicted orbital information for the GNSS satellites combined with antenna phase center offset data for each GNSS satellite. The antenna phase center offset data may indicate an offset distance from the center of mass of the GNSS satellite to a position of an apparent source of signal radiation from the respective GNSS satellite. The modified orbital assistance data may be in an earth-centered earth-fixed (ECEF) frame of reference and the antenna phase center offset data may be in a body-centered frame of reference.

In one implementation, a method for providing modified orbital assistance data to a mobile station to determine a location of the mobile station includes selecting a first frequency of a global navigation satellite system (GNSS) positioning signal, obtaining orbital assistance data for one or more GNSS satellites, where the orbital assistance data is with respect to the center of mass of the one or more GNSS satellites, and obtaining frequency-specific antenna phase center offset data for the one or more GNSS satellites for the first frequency. The method may further include determining the modified orbital assistance data based on the orbital assistance data, and the frequency-specific antenna phase center offset data and providing the modified orbital assistance data to the mobile station.

In another implementation, a server configured to provide modified orbital assistance data to a mobile station may comprise a communications interface configured to communicate with the mobile station, at least one memory, at least one processor coupled to the communications interface and the at least one memory, where the at least one processor is configured to: select a first frequency of a global navigation satellite system (GNSS) positioning signal, obtain orbital assistance data for one or more GNSS satellites, where the orbital assistance data is with respect to the center of mass of the one or more GNSS satellites, obtain frequency-specific antenna phase center offset data for the one or more GNSS satellites, determine the modified orbital assistance data based on the orbital assistance data, and the frequency-specific antenna phase center offset data, and provide the modified orbital assistance data to the mobile station.

In another implementation, a non-transitory computer-readable storage medium may include instructions that, when executed by one or more processors of a server, cause the server to perform operations including selecting a first frequency of a global navigation satellite system (GNSS), obtaining orbital assistance data for one or more GNSS satellites, wherein the orbital assistance data is with respect to the center of mass of the one or more GNSS satellites, obtaining frequency-specific antenna phase center offset data for the one or more GNSS satellites, determining the modified orbital assistance data based on the orbital assistance data, and the frequency-specific antenna phase center offset data, and providing the modified orbital assistance data to a mobile station.

In another implementation, a method for determining a location of a mobile station using orbital assistance data includes receiving satellite positioning signals from a plurality of global navigation satellite system (GNSS) satellites, receiving, from a server, a modified orbital assistance data, including orbital information modified to describe an antenna phase center offset of each GNSS satellite with respect to a first frequency, and determining the location of the mobile station based on the modified orbital assistance data and the first frequency of the satellite positioning signals.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
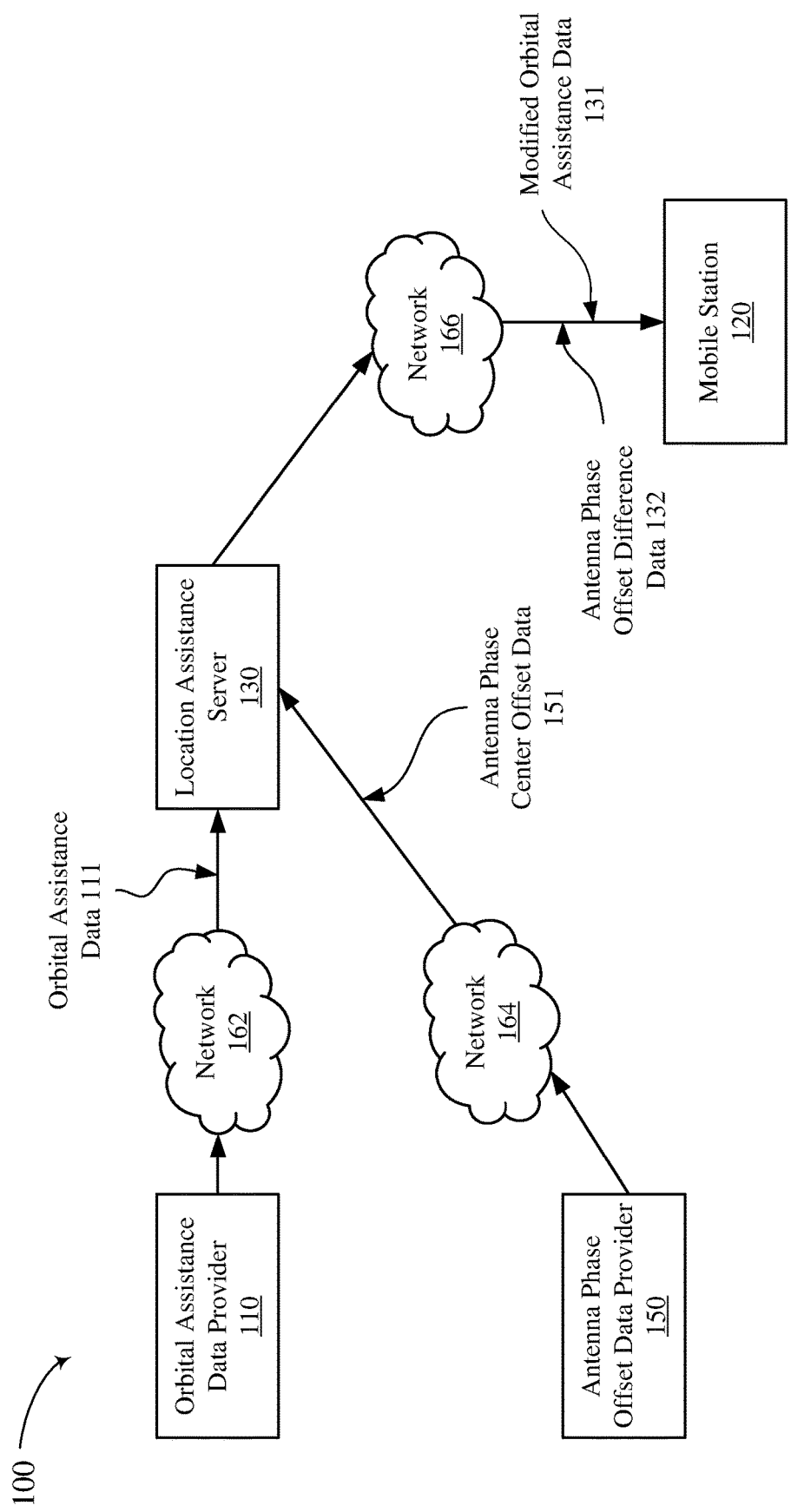
FIG. 1 is a block diagram of a communication system, according to some implementations.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Various implementations relate generally to modifying orbital assistance data for a mobile station. The orbital assistance data may be modified by a location assistance server that is separate from the mobile station. The mobile station may receive satellite positioning signals from a plurality of global navigational satellites and use the modified orbital assistance data to more quickly may determine its location. The modified orbital assistance information may include antenna phase center offset information to increase the accuracy of the determined location.

Particular implementations of the subject matter described in this disclosure can be implemented to realize one or more of the following potential advantages. In some implementations, by generating the modified mobile assistance data at the location assistance server, the mobile station is able to determine a more accurate position with reduced computational effort.

FIG. 1 is a block diagram of a communication system 100, according to some implementations. The communication system 100 may include an orbital assistance data provider 110, an antenna phase offset data provider 150, a location assistance server 130 and a mobile station 120. Although only one mobile station 120 is shown, in other implementations the communication system 100 may include any technically feasible number of mobile stations. The mobile station 120 also may be referred to as a station, a user equipment, a subscriber station, a mobile unit, a subscriber unit, a wireless unit, a remote unit, a mobile device, a wireless communication device, a wireless device, a remote device, a mobile subscriber station, an access terminal, a mobile terminal, a wireless terminal, a remote terminal, a handset, a user agent, a mobile client, a client, or some other suitable terminology.

The mobile station 120 may determine its location by receiving satellite positioning signals from a plurality of global navigation satellite system (GNSS) satellites (not shown for simplicity). Example GNSS include the Global Positioning System (GPS) operated by the United States Government, the Galileo system operated by the European Union, the BeiDou Navigation System operated by the Government of China, the GLONASS System operated by the Russian Federation, the Indian Regional Navigation Satellite System (IRNSS) operated by the Government of India, the Quasi-Zenith Satellite System (QZSS) operated by the Government of Japan, and the like. Satellites within a GNSS are referred to as a constellation. Each satellite transmits (e.g., broadcasts) a satellite positioning signal. The satellite positioning signals may be synchronized to a common time reference. The mobile station 120 receives the satellite positioning signals from a number of GNSS satellites that are in-view of the mobile station 120. The mobile station 120 determines the time of flight of the satellite positioning signals and, based on the known location of the GNSS satellites, determines its location.

A GNSS may transmit the satellite positioning signals through a plurality of frequencies or frequency bands. For example, GPS satellite positioning signals are transmitted through a first frequency of 1575.42 MHz (sometimes referred to as the L1 frequency), a second frequency of 1227.60 MHz (sometimes referred to as the L2 frequency), and a third frequency of 1176.45 MHz (sometimes referred to as the L5 frequency). Galileo satellite positioning signals are transmitted through 1575.42, 1278.75, 1191.795, 1176.450, and 1207.14 MHz frequencies. Other GNSS systems may use other frequencies.

The location assistance server 130 may provide a modified orbital assistance data 131 to the mobile station 120. The modified orbital assistance data 131 may include data regarding the predicted locations of the GNSS satellites within the constellation as well as data regarding a frequency-specific antenna phase offset associated with each GNSS satellite.

The location assistance server 130 may receive orbital assistance data 111 and/or predicted orbital parameter files that includes orbital assistance data 111 from the orbital assistance data provider 110. In some implementations, location assistance server 130 receives the orbital assistance data 111 via a network 162. The network 162 may include, but is not limited to, a network that supports Internet Protocol (IP) connections (e.g., the Internet). The location assistance server 130 may optionally include an interface, e.g., secure file transfer program (SFTP), for securely transferring the predicted orbit data from orbital assistance data provider 110.

The orbital assistance data 111 may include predicted orbital information for one or more satellites operating within a GNSS constellation. In some aspects, the orbital assistance data provider 110 may generate the orbital assistance data 111 periodically (e.g. every few hours) that is valid for an extended duration in time (e.g., 6 hours or more). The orbital assistance data 111 may also include 3-D uncertainty values for predicted satellite coordinates, uncertainty of predicted satellite clock corrections, as well as an indication of predicted outages. The predicted orbital information may predict orbits of the GNSS satellites with respect to the center of mass of the satellites in an earth-centered earth-fixed (ECEF) frame of reference.

The location assistance server 130 may also receive antenna phase center offset data 151 from the antenna phase offset data provider 150. In some implementations, location assistance server 130 receives the antenna phase center offset data 151 via a network 164 (which may be similar to the network 162). The antenna phase center offset data 151 describes a point or location on an antenna of a GNSS satellite (with respect to the center of mass of the GNSS satellite) that is an apparent source of transmitted satellite positioning signal (e.g., an apparent source of radiation with respect to the frequency of the satellite positioning signal). Furthermore, a GNSS satellite may transmit satellite positioning signals through more than one frequency. Thus, the antenna phase center offset data 151 may be frequency-specific and include information for the different frequencies (for example, different locations on the antenna) supported by the GNSS satellite. The mobile station 120 may determine a more accurate distance from the satellite by considering the origination point (e.g., transmission point) of the satellite positioning signal on the antenna instead of the center of mass of the associated GNSS satellite. In some implementations, using the antenna phase center offset data may improve the accuracy of the determined location to within five centimeters or less. The antenna phase center offset data 151 may be in a body-centered frame of reference. The antenna phase offset data provider 150 may be any publicly available source of antenna phase offset data such as, but not limited to, the International GNSS service.

Conventionally, the mobile station 120 receives the orbital assistance data 111 in the ECEF frame of reference and the antenna phase center offset data 151 in a body-centered frame of reference. In order to modify the orbital assistance data 111 with the antenna phase center offset data 151, the mobile station translates the frame of reference of both the antenna phase center offset data 151 and the orbital assistance data 111 to an earth-centered inertial (ECI) frame of reference. The mobile station 120 then combines the orbital assistance data 111 and the antenna phase center offset data 151 and convert the results back to ECEF frame of reference. Alternatively, mobile station 120 can translate antenna phase center offset data 151 in body-centered frame to an ECEF frame of reference. This correction can then be applied to the orbital assistance data 111 to obtain modified orbital assistance data 131.

The location assistance server 130 can off load the computational tasks described above associated using the orbital assistance data 111 and the antenna phase center offset data 151 from the mobile station 120 by performing the computations remotely (e.g., on the server) and providing the modified orbital assistance data 131 that combines the orbital assistance data 111 with the antenna phase center offset data 151. For example, the location assistance server 130 may translate the orbital assistance data 111 from the ECEF frame of reference to an ECI frame of reference, translate the antenna phase center offset data 151 from a body-centered frame of reference to the ECI frame of reference, determine a new (e.g., modified) orbital assistance data that modifies the orbital assistance data 111 with the antenna phase center offset data 151, and translate the modified orbital assistance data to the ECEF frame of reference. In some implementations, the modified orbital assistance data may be referenced to the antenna phase center offset data 151 (e.g., the modified orbital assistance data may refer to the apparent source of radiation of the satellite positioning signals instead of the center of mass of the GNSS satellites). Furthermore, since a GNSS satellite may transmit satellite positioning signals in more than one frequency, the location assistance server 130 may select one of the frequencies and use the antenna phase center offset data 151 associated with that frequency. The location assistance server 130 can provide the modified orbital assistance data 131 to the mobile station 120 through a network 166. The network 166 may be similar to the network 162 and/or the network 164. The modified orbital assistance data 131 may include an indication of the frequency selected by the location assistance server 130.

Since the antenna phase center offset data 151 may also include information that describes separate points on the antenna that may be associated with other frequencies of a satellite positioning signal, the location assistance server 130 can generate an antenna phase center offset difference data 132 that describes the distance between the point on the antenna associated with a first frequency of the satellite positioning signal and a point on the antenna associated with a second frequency of satellite positioning signal. In some implementations, the antenna phase center offset difference data 132 may be in a radial, along-track, and cross-track frame of reference. In some other implementations, the antenna phase center offset difference data 132 may be included with the modified orbital assistance data 131.

Although depicted as a separate network entity, in some implementations the location assistance server 130 may be any remote server, edge server (e.g. any feasible device in proximity to the mobile station 120), or base station (e.g., any feasible eNodeB, gNodeB, or the like) coupled to the mobile station 120.

Figure 2:
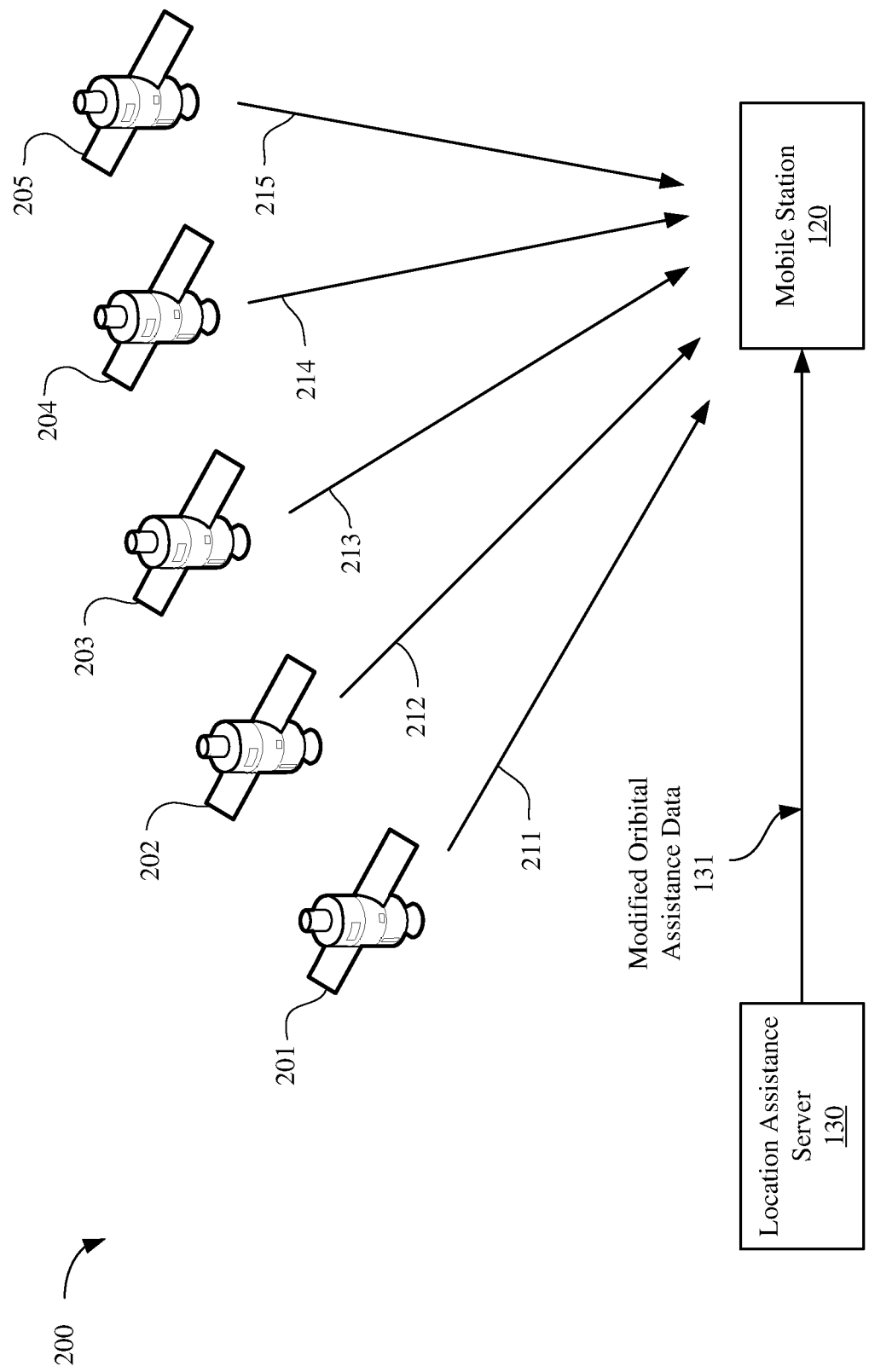
FIG. 2 shows an exemplary environment which may include the mobile station, the location server, and GNSS satellites.

FIG. 2 shows an exemplary environment 200 which may include the mobile station 120, the location server 130 and GNSS satellites 201-205. The GNSS satellites 201-205 may each transmit a respective satellite positioning signal 211-215. The mobile station 120 may determine its location by receiving modified orbital assistance data 131 from the location server 130 and satellite positioning signals 211-215. For example, the mobile station 120 may determine the time of flight of the satellite positioning signals 211-215, determine the locations of the GNSS satellites 201-205 using the modified orbital assistance data 131, and determine the location of the mobile station 120 that conforms to the time of flight of the satellite positioning signals 211-215 and the locations of the GNSS satellites 201-205. Notably, the satellite positioning signals 211-215 may be transmitted simultaneously in multiple frequencies or frequency bands. In some cases, the additional frequencies or frequency bands may provide the mobile station 120 additional satellite positioning signals to receive and determine a respective time of flight.

The GNSS satellites 201-205 may be the GNSS satellites that are "in-view" of the mobile station 120. In other words, the mobile station 120 may receive the satellite positioning signals 211-215 from the GNSS satellites 201-205. The GNSS constellation may include other GNSS satellites that are not in-view. That is, the navigation signals transmitted by other GNSS satellites may not be received by the mobile station 120. Although only five GNSS satellites are depicted in FIG. 2, in other implementations, the environment 200 may include any feasible number of GNSS satellites.

Each GNSS satellite 201-205 may transmit a respective navigation signal 211-215 that is received by the mobile station 120. The modified orbital assistance data 131 may provide the mobile station 120 information regarding the locations of the GNSS satellites 201-205. However, each GNSS satellite 201-205 may have a unique antenna phase center offset due to manufacturing and operational limitations. The modified orbital assistance information 131 may incorporate the antenna phase center offset data 151 with the orbital assistance data 111 for each GNSS satellite 201-205. In some implementations, the modified orbital assistance data 131 may include assistance data from all GNSS satellites included within the GNSS constellation. In other words, the modified orbital assistance data 131 may include assistance data for the in-view satellites as well as assistance data for GNSS satellite that are not in-view. The antenna phase offset center data 151 is described in more detail with respect to FIG. 3.

Figure 3:
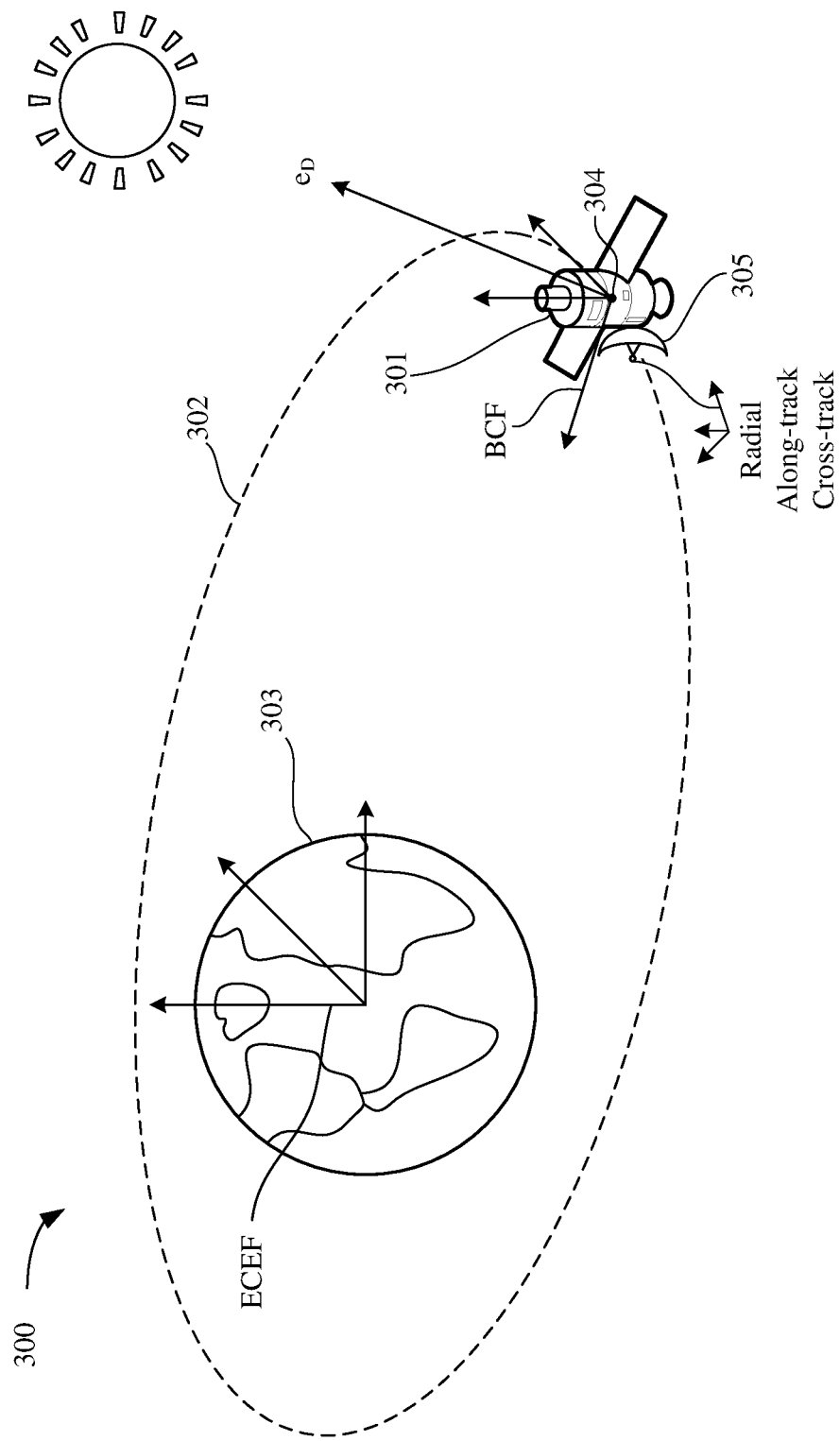
FIG. 3 depicts an exemplary simplified orbital map of a GNSS satellite.

FIG. 3 depicts an exemplary simplified orbital map 300 of a GNSS satellite 301. The orbital map 300 shows a single GNSS satellite 301 for simplicity. In other implementations, the orbital map 300 may include any number of GNSS satellites. Furthermore, the orbital map 300 shows the GNSS satellite 301 in an orbit 302 around the Earth 303. The orbital assistance data 111 may be determined with respect to the position of the Earth 303, and therefore, in an ECEF frame of reference.

The GNSS satellite 301 may have an associated center of mass 304. The orbital assistance data 111 may be determined (e.g., computed) with respect to the center of mass 304. Each GNSS satellite also has an antenna 305 to transmit the satellite positioning signals. Typically, the position of the antenna 305 is not coincident with the center of mass 304, which may cause errors in ranging calculations that determine the distance between the GNSS satellite 301 and the mobile station 120 (not shown for simplicity). Furthermore, the satellite positioning signal may effectively be transmitted from different locations on the antenna 305 based on the frequency associated with the satellite positioning signal.

As described with respect to FIG. 1, the antenna phase center offset data 151 describes the difference between the center of mass 304 and an apparent source of the satellite positioning signal on the antenna 305. Furthermore, the antenna phase center offset data 151 may also describe different locations (e.g., apparent positions) on the antenna 305 that are associated with different frequencies of satellite positioning signals. As shown, the antenna offset data 151 is conventionally described in a body-centered frame of reference. The body-centered frame of reference is a frame of reference that is referenced to locations along or within the GNSS satellite 301 and is a function of satellite position in its respective orbit and/or orientation with respect to the sun.

The antenna phase center offset data 151 may be a constant offset in a body-centered frame of reference. However, the antenna phase center offset data 151 may be a function of time and the position of the sun with respect to the GNSS satellite 301 in an earth-centered frame of reference. For example, orientation of the GNSS satellite 301 may change as the GNSS satellite 301 orbits around the Earth 303 to maintain an orientation of the solar panels of the GNSS satellite 301 to the sun (shown as by vector $e_D$). In other words, the antenna phase center offset data 151 may be based on the position of the GNSS satellite 301 in its orbit 302 and a time of day.

The location server 130 can generate the modified orbital assistance data 131 based on the orbital assistance data 111 and the antenna phase center offset data 151. Since the antenna phase center offset data 151 is dependent on the frequency of the satellite positioning signal, the location server 130 may determine or select a frequency for which the modified orbital assistance data 131 is determined. The selected frequency may be specified by a user or selected based on conventional or typical frequencies used by the GNSS satellites to transmit the satellite positioning signal. In some implementations, the location server 130 may also determine the position of the sun with respect to the GNSS satellite 301 as a function of time thereby taking into account the orbit of the GNSS satellite 301 and its orientation to the sun. The orbital assistance data 111 and the modified orbital assistance data 131 may be in the ECEF frame of reference and the antenna phase center offset data 151 may be in a body-centered frame of reference. The modified orbital assistance data 131 may be referenced to the antenna phase center offset data 151.

The antenna phase center offset data 151 may also include data to locate an antenna phase center offset for other frequencies (e.g., frequencies other than the selected frequency) of satellite positioning signal. The location server 130 may determine an antenna phase offset difference that describes the distance between the antenna phase offset data associated with the selected frequency and a second frequency. For example, if the L1 frequency is selected by the location server 130 to generate the modified orbital assistance data 131, the location server 130 may generate an antenna phase center offset difference data 132 that describes the change in location on the antenna 305 that an L2 frequency satellite positioning signal may be transmitted from. The antenna phase center offset difference data 132 may be in a radial, along-track, and cross-track frame of reference. The radial, along-track, and cross-track frame of reference may be a moving frame of reference where the radial vector is toward the Earth 303, the along-track vector is in the direction of the orbit 302, and the cross-track vector is orthogonal to the radial and along-track vectors. By providing the antenna phase center offset difference data 132 in the radial, along-track, and cross-track frame of reference, the location server 130 enables the mobile station 120 to easily and quickly adjust any ranging information that has been performed with the modified orbital assistance data 131. Furthermore, if the along-track and cross-track components of the antenna phase center offset difference data 132 are small relative to the radial component, then the mobile station 120 may determine the distance from the GNSS satellite 301 and the mobile station 120 by considering just the radial component of the antenna phase center offset difference data 132 and ignoring the along-track and cross-track components. For example, a distance between the GNSS satellite 301 and the mobile station 120 may be easily and simply be offset by the addition or subtraction of the antenna phase center offset difference data 132. In some implementations, the location assistance server 130 may approximate the actual antenna phase center offset difference data with a best-fit mathematical function. In some other implementations, the antenna phase center offset difference data 132 may be included with the modified orbital assistance data 131.

Figure 4:
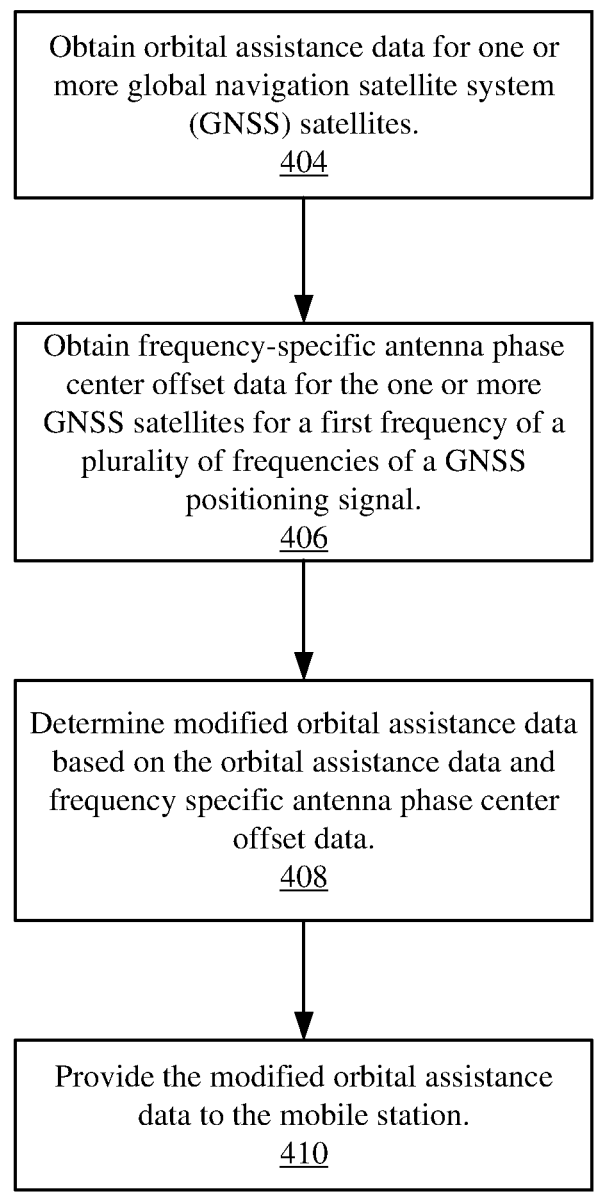
FIG. 4 shows a flowchart for an example operation for providing modified orbital assistance data to a mobile station.

FIG. 4 shows a flowchart for an example operation 400 for providing modified orbital assistance data 131 to a mobile station 120. The operation 400 is described below with respect to the location assistance server 130 of FIGS. 1 and 2 for illustrative purposes only. In other implementations, the operation 400 may be performed by any other technically feasible server or device.

At block 404, the location assistance server 130 obtains the orbital assistance data 111 for one or more of the GNSS satellites. The orbital assistance data 111 may include predicted orbital information for the one or more GNSS satellites. The orbital assistance data 111 may be provided by any technically feasible source and may be in an ECEF frame of reference.

At block 406, the location assistance server 130 obtains frequency-specific antenna phase center offset data 151 for the one or more GNSS satellites for a first frequency of a plurality of frequencies of a GNSS positioning signal. The antenna phase center offset data 151 may describe a location or position on the antenna of the GNSS satellite associated with the transmission of the satellite positioning signal of the selected frequency. The location may be an apparent source of the GNSS positioning signal on the antenna, where different locations are associated with different frequencies of the GNSS positioning signal. In some implementations, the antenna phase center offset data 151 may specify a distance from the center of mass of a GNSS satellite to a position on an antenna of a respective GNSS satellite associated with an apparent source of radiation of the first frequency of the GNSS positioning signal.

At block 408, the location assistance server 130 determines the modified orbital assistance data based on the orbital assistance data (obtained at block 404) and the antenna phase center offset data (obtained at block 406). The modified orbital assistance data may be in an ECEF frame of reference and may include an indication of the frequency associated with the frequency-specific antenna phase center offset data. In some implementations, the modified orbital assistance data 131 may include antenna phase center offset difference data which may indicate the difference between antenna phase centers associated with different GNSS satellite frequencies. In some implementations, the modified orbital assistance data 131 may include the antenna phase center offset difference data 132 which may be approximated with a best-fit mathematical function.

In some implementations, the antenna phase center offset difference may be in a radial, along-track, and cross-track frame of reference. The antenna phase center offset difference is based on a position of the one or more GNSS satellites within their respective orbits and a time of day.

At block 410, the location assistance server 130 provides the modified orbital assistance data 131 to the mobile station 120. The modified orbital assistance data may be provided via a network (such as the network 166 of FIG. 1) or by any other feasible mechanism.

Figure 5:
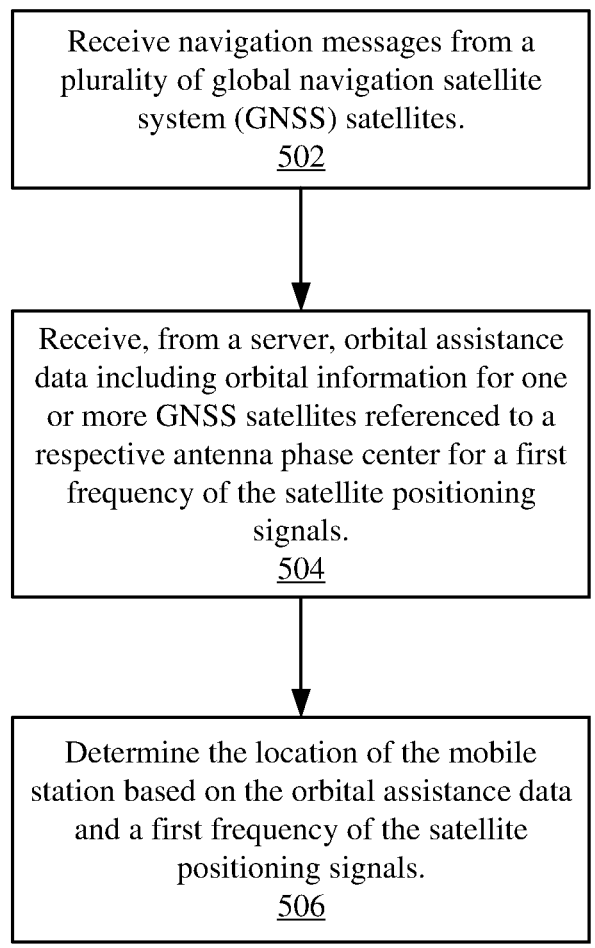
FIG. 5 shows a flowchart for example operation for using modified orbital assistance data to determine the location of a mobile station.

FIG. 5 shows a flowchart for example operation 500 for using modified orbital assistance data 131 to determine the location of a mobile station 120. The operation 500 is described below with respect to the mobile station 120 of FIG. 1 for illustrative purposes only. The operation 500 also may be performed by any other feasible mobile station or device.

At block 502, the mobile station 120 receives satellite positioning signals from a plurality of GNSS satellites. The GNSS satellites may transmit satellite positioning signals through two or more frequencies or frequency bands. The mobile station may receive the satellite positioning signals through at least one of the frequencies or frequency bands.

At block 504, the mobile station 120 receives, from a server, orbital assistance data including orbital information for one or more GNSS satellites referenced to a respective antenna phase center for a first frequency of the satellite positioning signals. In some implementations, the mobile station 120 may receive the modified orbital assistance data 131 which may include orbital assistance data describing the predicted orbit information for one or more of the GNSS satellites that is referenced to an associated antenna phase center for the first frequency. In some implementations, the orbital assistance data may be in an ECEF frame of reference.

In some implementations, the orbital assistance data may include antenna phase center offset difference data 132 for one or more frequencies other than the first frequency. The antenna phase center offset difference data may indicate the difference between an apparent source of the first frequency of the satellite positioning signal and an apparent source of other frequencies of the satellite positioning signal. The mobile station may select a second frequency of the satellite positioning signals and determine the location of the mobile station using the second frequency of the satellite positioning signals and the antenna phase center offset difference data 132. In some implementations, the antenna phase center offset difference data 132 for a second frequency of the satellite positioning signals may be in a radial, along-track, and cross-track frame of reference.

At block 506, the mobile station 120 may determine its location based on the orbital assistance data and a first frequency of the satellite positioning signals. In some implementations, the mobile station 120 may determine its location by using a frequency other than the first frequency, using radial antenna phase center offset difference data, and ignoring along-track and cross-track antenna phase center offset difference data. In some implementations, the mobile station 120 may determine its location by using a combination of frequencies broadcast by one or more GNSS satellites and using the modified orbital assistance data 131. In still other implementations, the antenna phase center offset difference data 132 for each of the one or more frequencies is with respect to the first frequency.

Figure 6:
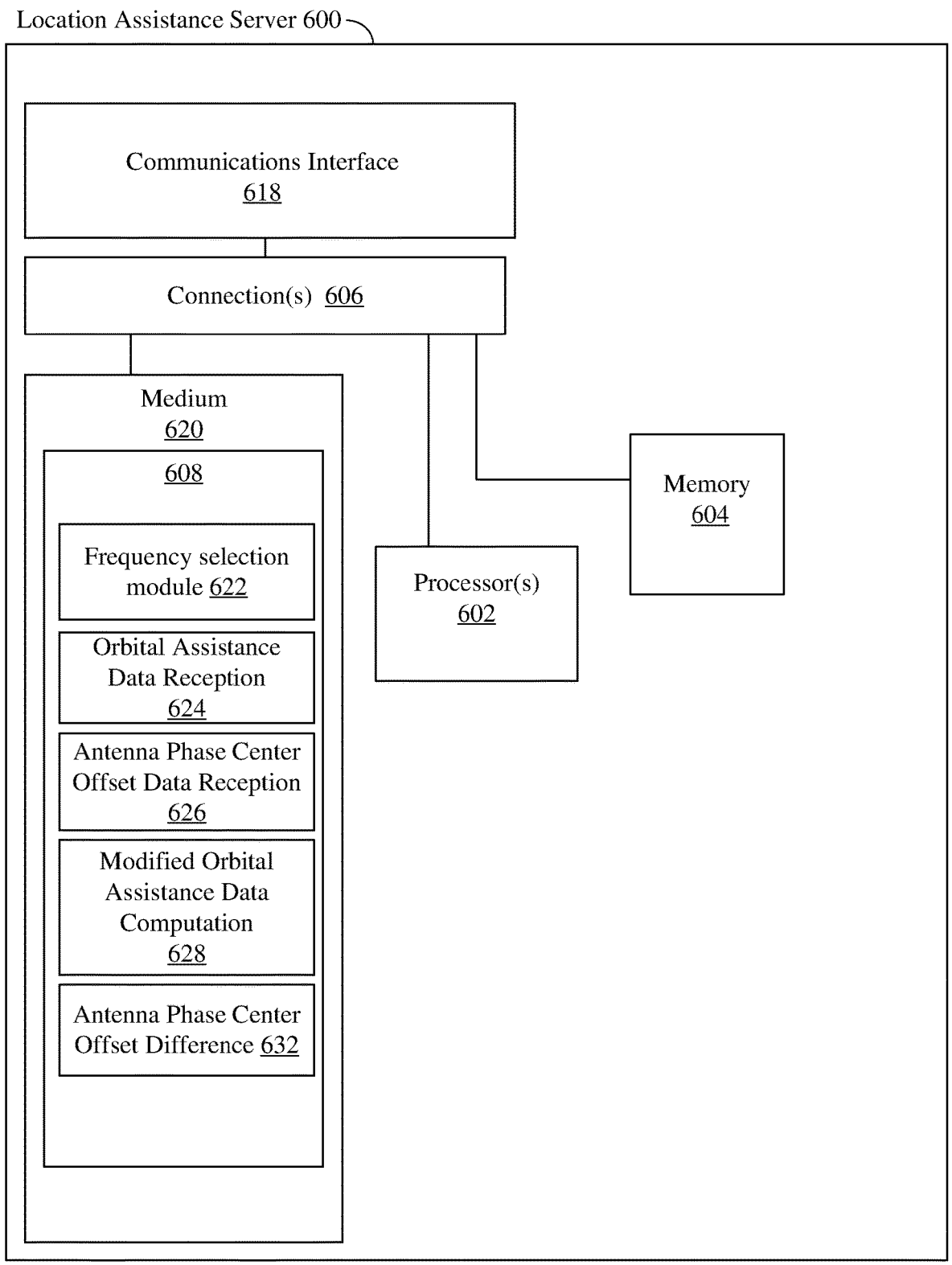
FIG. 6 shows a schematic block diagram illustrating certain exemplary features of a location assistance server, that is configured to provide modified orbital assistance data to a mobile station, as described herein.

FIG. 6 shows a schematic block diagram illustrating certain exemplary features of a location assistance server 600, that is configured to provide modified orbital assistance data to a mobile station, as described herein. Location assistance server 600 may, for example, include one or more processors 602, memory 604, an external interface, which may include a communications interface 618 (e.g., wireline or wireless network interface to base stations and/or entities in the core network), which may be operatively coupled with one or more connections 606 (e.g., buses, lines, fibers, links, etc.) to non-transitory computer readable medium 620 and memory 604. In certain example implementations, all or part of location server 600 may take the form of a chipset, and/or the like.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of location server 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in location server 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in location server 600 is merely exemplary, and as such the functionality of the modules and/or data structures may be combined, separated, and/or be structured in different ways depending upon the implementation of the location server 600.

The medium 620 and/or memory 604 may include a frequency selection module 622 that, when implemented by the one or more processors 602, configures the one or more processors 602 to select a frequency from a plurality of frequencies associated with the satellite positioning signals. The satellite positioning signals may be transmitted by a GNSS satellite in more than one frequency. For example, when operating with GPS satellite positioning signals in the L1 and L2 frequency bands, execution of the frequency selection module 622 may cause the location assistance server 600 to select either the L1 or the L2 frequency band.

The medium 620 and/or memory 604 may include an orbital assistance data reception module 624 that, when implemented by the one or more processors 602, configures the one or more processors 602 to receive and/or obtain orbital assistance data for one or more GNSS satellites. The orbital assistance data may describe predicted orbits for the GNSS satellites with respect to their center of mass. The orbital assistance data may be received and/or obtained from any technically feasible source.

The medium 620 and/or memory 604 may include an antenna phase center offset data reception module 626 that when implemented by the one or more processors 602 configures the one or more processors 602 to receive and/or obtain antenna phase center information. For example, execution of the antenna phase center offset data reception module 626 may cause the location assistance server 600 to receive antenna center phase offset data that describes points on the antenna of the GNSS satellites that maybe associated with the transmission of different frequencies of satellite positioning signals.

The medium 620 and/or memory 604 may include a modified orbital assistance data computation module 628 that when implemented by the one or more processors 602 configures the one or more processors 602 to determine a modified orbital assistance data, such as the modified orbital assistance data 131 of FIG. 1. In some implementations, execution of the modified orbital assistance data computation module 628 may cause the location assistance server 130 to determine the modified orbital assistance data 131 as described with respect to FIG. 4.

The medium 620 and/or memory 604 may include an antenna phase center offset difference module 632 that when implemented by the one or more processors 602 configure the one or more processors 602 to determine a difference between phase center offset locations (e.g., positions) on an antenna of a GNSS satellite that are associated with different frequencies of the satellite positioning signals.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to provide modified orbital assistance data in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a wireless transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by one or more processors 602 may be operatively enabled to perform all or portions of the example operations as described herein. Computer readable medium 620 may be a part of memory 604.

An entity in a communication system, such as the location assistance server 600, may be configured to provide modified orbital assistance data within the communication system and may include a means for selecting a first frequency of a GNSS positioning signal may be, e.g., the one or more processors 602 with dedicated hardware or implementing executable code or software instructions in the memory 604 and/or medium 620 such as the frequency selection module 622. A means for obtaining orbital assistance data from a one or more entities in the communication system may be, e.g., the communications interface 618 and one or more processors 602 with dedicated hardware or implementing executable code or software instructions in memory 604 and/or medium 620 such as the orbital assistance data reception module 624. A means for obtaining frequency-specific antenna phase center offset data from one or more entities in the communication system may be, e.g., the communications interface 618 and one or more processors 602 with dedicated hardware or implementing executable code or software instructions in memory 604 and/or medium 620 such as the antenna phase center offset data reception module 626. A means for determining the modified orbital assistance data may be, e.g., one or more processors 602 with dedicated hardware or implementing executable code or software instructions in memory 604 and/or medium 620 such as the modified orbital assistance data computation module 628.

In one implementation, the entity may be the location assistance server 600 and may further include a means for determining antenna phase center offset difference of the one or more GNSS satellites for one or more frequencies that differ from the first frequency, wherein the modified orbital assistance data includes the antenna phase center offset difference of the one or more GNSS satellites may be, e.g., one or more processors 602 with dedicated hardware or implementing executable code or software instructions in memory 604 and/or medium 620 such as the antenna phase center offset difference module 632.

Figure 7:
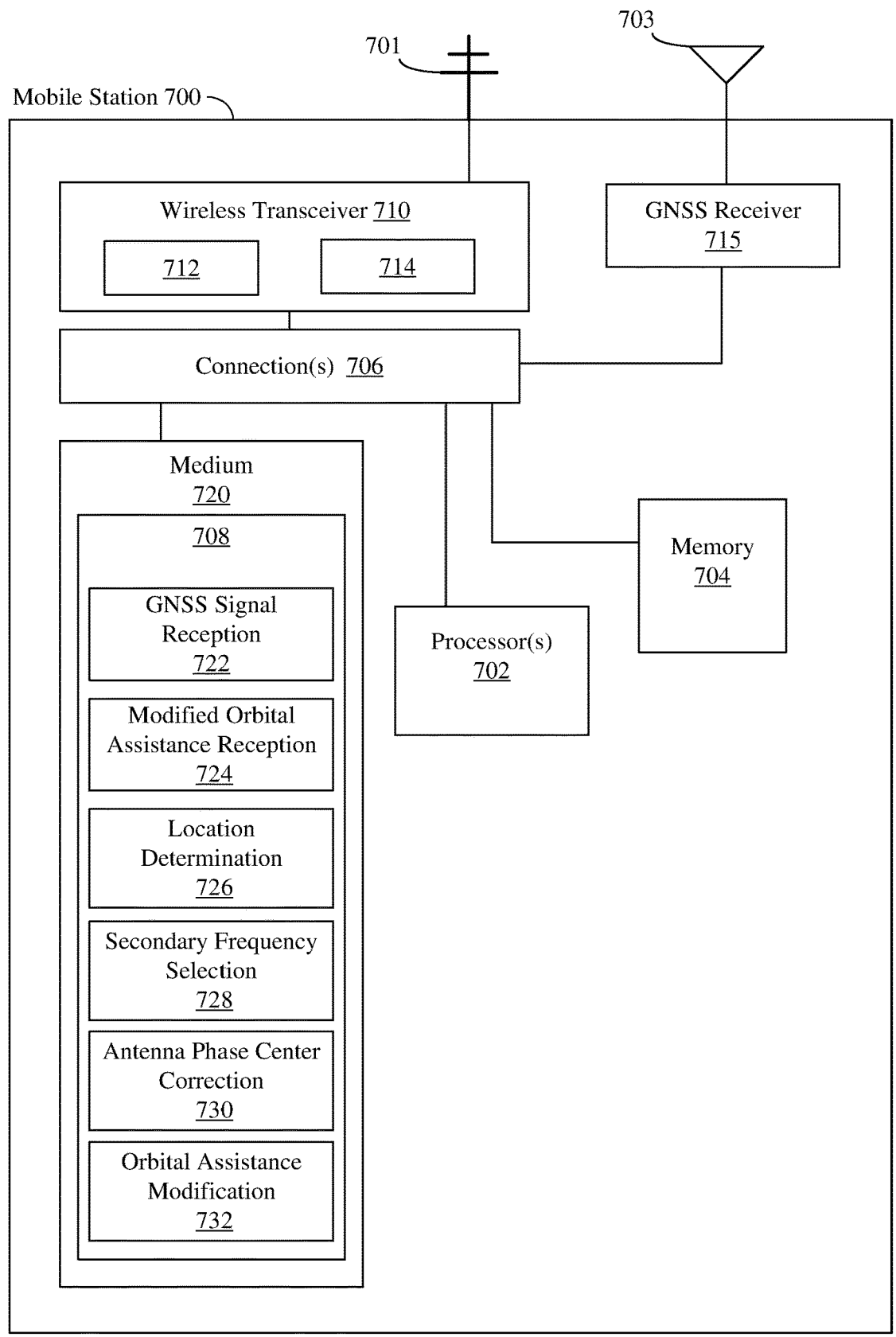
FIG. 7 shows a block diagram illustrating certain exemplary features of a mobile station that is configured to perform positioning within a wireless network.

FIG. 7 shows a block diagram illustrating certain exemplary features of a mobile station 700 that is configured to perform positioning within a wireless network. The mobile station 700 may be an example of the mobile station 120 of FIGS. 1 and 2. The mobile station 700 may, for example, include one or more processors 702, memory 704, an external interface such as a at least one wireless transceiver 710 (e.g., wireless network interface), which may be operatively coupled with one or more connections 706 (e.g., buses, lines, fibers, links, etc.) to a non-transitory computer readable medium 720 and memory 704. The mobile station 700 may further include additional items, which are not shown, such as a user interface that may include e.g., a display, a keypad or other input device, such as virtual keypad on the display, through which a user may interface with mobile station 700. In certain example implementations, all or part of mobile station 700 may take the form of a chipset, and/or the like. Wireless transceiver 710 may, for example, include a transmitter 712 enabled to transmit one or more signals over one or more types of wireless communication networks and a receiver 714 to receive one or more signals transmitted over the one or more types of wireless communication networks.

In some implementations, mobile station 700 may include a mobile station antenna 701, which may be internal or external. Mobile station antenna 701 may be used to transmit and/or receive signals processed by wireless transceiver 710. In some embodiments, mobile station antenna 701 may be coupled to wireless transceiver 710.

In some implementations, the mobile station 700 may include a GNSS receiver 715. The GNSS receiver 715 may receive satellite positioning signals through the GNSS antenna 703 and determine the location of the mobile station 700. In some other implementations, the one or more processors 702 may receive time of flight information from the GNSS receiver 715 and determine the location of the mobile station 700. The GNSS receiver 715 and/or one or more processors 702 may use modified orbital assistance data 131 to determine the location of the mobile station 700. In some implementations, functionality of the GNSS receiver 715 may be included with, or provided by, the wireless transceiver 710. Thus, the wireless transceiver 710 may receive satellite positioning signals and determine the location of the mobile station 700 in a manner similar to the GNSS receiver 715. The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of mobile station 700.

The medium 720 and/or memory 704 may store instructions or program code 708 that contain executable code or software instructions that when executed by the one or more processors 702, cause the one or more processors 702 to operate as a special purpose computer programmed to perform the techniques disclosed herein. As illustrated in mobile station 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in mobile station 700 is merely exemplary, and as such the functionality of the modules and/or data structures may be combined, separated, and/or be structured in different ways depending upon the implementation of the mobile station 700.

The medium 720 and/or memory 704 may include a GNSS signal reception module 722 that, when implemented by the one or more processors 702, configures the one or more processors 702 and/or the GNSS receiver 715 (or the wireless transceiver 710 providing the functionality of the GNSS receiver 715) to receive a first frequency of satellite positioning signals. In some implementations, execution of the GNSS signal reception module 722 causes the mobile station 700 to determine the time of flight associated with the received satellite positioning signals.

The medium 720 and/or memory 704 may include a modified orbital assistance reception module 724 that when implemented by the one or more processors 702 configures the one or more processors 702 and/or the wireless transceiver 710 to receive the modified orbital assistance data 131

The medium 720 and/or memory 704 may include a location determination module 726 that, when implemented by the one or more processors 702, configures the one or more processors 702 to determine a location of the mobile station 700 based at least on GNSS satellite positioning signals received by the GNSS receiver 715 (or the wireless transceiver 710 providing the functionality of the GNSS receiver 715). In some implementations, execution of the location determination module 726 may cause the mobile station 700 to determine the location of the mobile station 700 based on received GNSS satellite positioning signals and the modified orbital assistance data 131. In some other implementations, execution of the location determination module 726 may cause the mobile station 700 to determine the location of the mobile station 700 based on received GNSS satellite positioning signals and antenna phase center offset data that may be include with the modified orbital assistance data 131.

The medium 720 and/or memory 704 may include a secondary frequency selection module 728 that, when implemented by the one or more processors 702, configures he one or more processors 702 to select a second frequency of a GNSS satellite positioning signal. In some implementations, execution of the secondary frequency selection module 728 may cause the mobile station 700 to select a second GNSS satellite positioning signal frequency to determine the location of the mobile station 700.

The medium 720 and/or memory 704 may include an antenna phase center correction module 730 that, when implemented by the one or more processors 702, configures the one or more processors 702 to determine a difference between at least two antenna phase centers (or example, associated with two different frequencies of satellite positioning signals. In some implementations, the antenna phase center correction module 730 may be implemented via a neural network. For example, an artificial or simulated neural network may be used to model various antenna phase centers associated with various frequencies for one or GNSS satellites.

The medium 720 and/or memory 704 may include an orbital assistance modification module 732 that, when implemented by the one or more processors 702, configures the one or more processors 702 to modify the modified orbital assistance data 131 based on the determined difference between at least two antenna phase centers.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support determining the location and/or position of a mobile station in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a wireless transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable code 708 stored thereon, which if executed by one or more processors 702 may be operatively enabled to perform all or portions of the example operations as described herein. Computer readable medium 720 may be a part of memory 704.

An entity in a communication system, such as mobile station 700, may be configured to determine the location of the mobile station 700 and may include a means for receiving GNSS satellite positioning signals, which may be, e.g., the GNSS receiver 715 (or the wireless transceiver 710 providing the functionality of the GNSS receiver 715) and one or more processors 702 with dedicated hardware or implementing executable code or software instructions in memory 704 and/or medium 720 such as the GNSS signal reception module 722. A means for receiving modified orbital assistance data may be, e.g., the wireless transceiver 710 and one or more processors 702 with dedicated hardware or implementing executable code or software instructions in memory 704 and/or medium 720 such as the modified orbital assistance reception module 724. A means for determining the location of the mobile station 700 may be, e.g., the wireless transceiver 710 and one or more processors 702 with dedicated hardware or implementing executable code or software instructions in memory 704 and/or medium 720 such as the location determination module 726.

In one implementation, the entity may be the mobile station 700 and may further include a means for selecting a second frequency of a satellite positioning signal may be, e.g., one or more processors 702 with dedicated hardware or implementing executable code or software instructions in memory 704 and/or medium 720 such as the secondary frequency selection module 728. A means for determining the location of the mobile station 700 using the second frequency of the satellite positioning signals and the antenna phase center offset difference data may be, e.g., one or more processors 702 with dedicated hardware or implementing executable code or software instructions in memory 704 and/or medium 720 such as the location determination module 726. A means for determining an antenna phase center correction based on the antenna phase center offset difference data may be, e.g., one or more processors 702 with dedicated hardware or implementing executable code or software instructions in memory 704 and/or medium 720 such as the antenna phase center correction module 730. A means for modifying the orbital assistance data based on the antenna phase center correction may be, e.g., one or more processors 702 with dedicated hardware or implementing executable code or software instructions in memory 704 and/or medium 720 such as the orbital assistance modification module 732.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In some implementations, a method (1) for providing modified orbital assistance data to a mobile station to determine a location of the mobile station, the method performed by a server and comprising: obtaining orbital assistance data for one or more global navigation satellite system (GNSS) satellites, wherein the orbital assistance data is with respect to a center of mass of the one or more GNSS satellites, obtaining frequency-specific antenna phase center offset data for the one or more GNSS satellites for a first frequency for a plurality of frequencies of a GNSS positioning signal, determining the modified orbital assistance data based on the orbital assistance data, and the frequency-specific antenna phase center offset data, and providing the modified orbital assistance data to the mobile station.

There may be some implementations (2) of the above method (1), wherein the orbital assistance data is in an earth-centered earth-fixed (ECEF) frame of reference and the frequency-specific antenna phase center offset data is in a body-centered frame of reference.

There may be some implementations (3) of the above method (1), wherein the frequency-specific antenna phase center offset data indicates an offset distance from a center of mass of a GNSS satellite to a position on an antenna of a respective GNSS satellite associated with an apparent source of radiation of the first frequency of the GNSS positioning signal.

There may be some implementations (4) of the above method (1), wherein the modified orbital assistance data includes an indication of the first frequency of the GNSS positioning signal.

There may be some implementations (5) of the above method (1), further comprising determining an antenna phase center offset difference of the one or more GNSS satellites for one or more frequencies that differ from the first frequency, wherein the modified orbital assistance data includes the antenna phase center offset difference of the one or more GNSS satellites.

There may be some implementations (6) of the above method (5), wherein the antenna phase center offset difference of the one or more GNSS satellites is in a radial, along-track, and cross-track frame of reference.

There may be some implementations (7) of the above method (5), wherein the antenna phase center offset difference is based on a position of the one or more GNSS satellites within their respective orbits and a time of day.

There may be some implementations (8) of the above method (5), wherein the antenna phase center offset difference is based on a best-fit mathematical approximation of actual antenna phase offset differences.

There may be some implementations (9) of the above method (1), wherein the modified orbital assistance data includes an orbital position for one or more GNSS satellites in an ECEF frame of reference and referenced to the frequency-specific antenna phase center for the first frequency selected of the GNSS positioning signal.

In some implementations, a server (10) configured to provide modified orbital assistance data to a mobile station, comprising: a memory, a communications interface configured to communicate with the mobile station, one or more processors operably coupled to the communications interface and the memory, the one or more processors configured to: obtain orbital assistance data for one or more global navigation satellite system (GNSS) satellites, wherein the orbital assistance data is with respect to a center of mass of the one or more GNSS satellites, obtain frequency-specific antenna phase center offset data for the one or more GNSS satellites for a first frequency for a plurality of frequencies of a GNSS positioning signal, determine the modified orbital assistance data based on the orbital assistance data, and the frequency-specific antenna phase center offset data, and provide the modified orbital assistance data to the mobile station.

There may be some implementations (11) of the server (10), wherein the orbital assistance data is in an earth-centered earth-fixed (ECEF) frame of reference and the frequency-specific antenna phase center offset data is in a body-centered frame of reference.

There may be some implementations (12) of the server (10), wherein the frequency-specific antenna phase center offset data indicates an offset distance from a center of mass of a GNSS satellite to a position on an antenna of a respective GNSS satellite associated with an apparent source of radiation of the first frequency of the GNSS positioning signal.

There may be some implementations (13) of the server (10), wherein the modified orbital assistance data includes an indication of the first frequency of the GNSS positioning signal.

There may be some implementations (14) of the server (10), wherein the one or more processors are further configured to determine an antenna phase center offset difference of the one or more GNSS satellites for one or more frequencies that differ from the first frequency, wherein the modified orbital assistance data includes the antenna phase center offset difference of the one or more GNSS satellites.

There may be some implementations (15) of the server (14), wherein the antenna phase center offset difference of the one or more GNSS satellites is in a radial, along-track, and cross-track frame of reference.

There may be some implementations (16) of the server (14), wherein the antenna phase center offset difference is based on a position of the one or more GNSS satellites within their respective orbits and a time of day.

There may be some implementations (17) of the server (14), wherein the antenna phase center offset difference is based on a best-fit mathematical approximation of actual antenna phase offset differences.

There may be some implementations (18) of the server (10), wherein the modified orbital assistance data includes an orbital position for one or more GNSS satellites in an ECEF frame of reference and referenced to a frequency-specific antenna phase center for the first frequency of the GNSS positioning signal.

In some implementations, non-transitory computer-readable storage medium (19) comprising instructions that, when executed by one or more processors of a server, cause the server to perform operations comprising: obtaining orbital assistance data for one or more global navigation satellite system (GNSS) satellites, wherein the orbital assistance data is with respect to a center of mass of the one or more GNSS satellites, obtaining frequency-specific antenna phase center offset data for the one or more GNSS satellites for a first frequency for a plurality of frequencies of a GNSS positioning signal, determining a modified orbital assistance data based on the orbital assistance data, and the frequency-specific antenna phase center offset data, and providing the modified orbital assistance data to a mobile station.

There may be some implementations (20) of the non-transitory computer-readable storage medium (19), wherein the orbital assistance data is in an earth-centered earth-fixed (ECEF) frame of reference and the frequency-specific antenna phase center offset data is in a body-centered frame of reference.

There may be some implementations (21) of the non-transitory computer-readable storage medium (19), wherein the frequency-specific antenna phase center offset data indicates an offset distance from a center of mass of a GNSS satellite to a position on an antenna of a respective GNSS satellite associated with an apparent source of radiation of the first frequency of the GNSS positioning signal.

There may be some implementations (22) of the non-transitory computer-readable storage medium (19), wherein the modified orbital assistance data includes an indication of the first frequency of the GNSS positioning signal.

There may be some implementations (23) of the non-transitory computer-readable storage medium (19) further comprising: determining an antenna phase center offset difference of the one or more GNSS satellites for one or more frequencies that differ from the first frequency, wherein the modified orbital assistance data includes the antenna phase center offset difference of the one or more GNSS satellites.

There may be some implementations (24) of the non-transitory computer-readable storage medium (23), wherein the antenna phase center offset difference of the one or more GNSS satellites is in a radial, along-track, and cross-track frame of reference.

There may be some implementations (25) of the non-transitory computer-readable storage medium (23), wherein the antenna phase center offset difference is based on a position of the one or more GNSS satellites within their respective orbits and a time of day.

There may be some implementations (26) of the non-transitory computer-readable storage medium (23) wherein the antenna phase center offset difference is based on a best-fit mathematical approximation of actual antenna phase offset differences.

There may be some implementations (27) of the non-transitory computer-readable storage medium (19), wherein the modified orbital assistance data includes an orbital position for one or more GNSS satellites in an ECEF frame of reference and referenced to a frequency-specific antenna phase center for the first frequency selected of the GNSS positioning signal.

In some implementations, a server (28) configured to provide modified orbital assistance data to a mobile station, comprising: means for obtaining orbital assistance data for one or more global navigation satellite system (GNSS) satellites, wherein the orbital assistance data is with respect to a center of mass of the one or more GNSS satellites, means for obtaining frequency-specific antenna phase center offset data for the one or more GNSS satellites for a first frequency for a plurality of frequencies of a GNSS positioning signal, means for determining the modified orbital assistance data based on the orbital assistance data, and the frequency-specific antenna phase center offset data, and means for providing the modified orbital assistance data to the mobile station.

There may be some implementations (29) of the server (28), wherein the orbital assistance data is in an earth-centered earth-fixed (ECEF) frame of reference and the frequency-specific antenna phase center offset data is in a body-centered frame of reference.

There may be some implementations (30) of the server (28), wherein the frequency-specific antenna phase center offset data indicates an offset distance from a center of mass of a GNSS satellite to a position on an antenna of a respective GNSS satellite associated with an apparent source of radiation of the first frequency of the GNSS positioning signal.

There may be some implementations (31) of the server (28), wherein the modified orbital assistance data includes an indication of the first frequency of the GNSS positioning signal.

There may be some implementations (32) of the server (28), further comprising means for determining an antenna phase center offset difference of the one or more GNSS satellites for one or more frequencies that differ from the first frequency, wherein the modified orbital assistance data includes the antenna phase center offset difference of the one or more GNSS satellites.

There may be some implementations (33) of the server (32), wherein the antenna phase center offset difference of the one or more GNSS satellites is in a radial, along-track, and cross-track frame of reference.

There may be some implementations (34) of the server (32), wherein the antenna phase center offset difference is based on a position the one or more GNSS satellites within their respective orbits and a time of day.

There may be some implementations (35) of the server (32), wherein the antenna phase center offset difference is based on a best-fit mathematical approximation of actual antenna phase offset differences.

There may be some implementations (36) of the server 28, the modified orbital assistance data includes an orbital position for the one or more GNSS satellites in an ECEF frame of reference and referenced to a frequency-specific antenna phase center for the first frequency selected of the GNSS positioning signal.

Implementation examples are described in the following numbered clauses:

1. A method for determining a location of a mobile station using orbital assistance data, the method comprising: receiving satellite positioning signals from a plurality of global navigation satellite system (GNSS) satellites; receiving, from a server, the orbital assistance data, including orbital information for one or more GNSS satellites referenced to a respective antenna phase center for a first frequency of the satellite positioning signals; and determining the location of the mobile station based on the orbital assistance data and the satellite positioning signals.

2. The method of clause 1, wherein the orbital assistance data is in an earth-centered earth-fixed (ECEF) frame of reference.

3. The method of any of clauses 1-2, wherein the orbital assistance data comprises an antenna phase center offset difference data for one or more frequencies that differ from the first frequency for the one or more GNSS satellites, wherein determining the location of the mobile station further comprises: selecting a second frequency of the satellite positioning signals; and determining the location of the mobile station using the second frequency of the satellite positioning signals and the antenna phase center offset difference data.

4. The method of clause 3, wherein the antenna phase center offset difference data for the second frequency is in a radial, along-track, and cross-track frame of reference.

5. The method of clause 4, wherein determining the location of the mobile station comprises using radial antenna phase center offset difference data and ignoring along-track and cross-track antenna phase center offset difference data.

6. The method of any of clauses 3-5, wherein the antenna phase center offset difference data for each of the one or more frequencies is with respect to the first frequency.

7. The method of any of clauses 3-6, wherein the second frequency is different than the first frequency.

8. The method of any of clauses 3-7, wherein the antenna phase center offset difference data includes an offset distance between a first apparent source of radiation on an antenna of a GNSS satellite associated with the first frequency and a second apparent source of radiation on the antenna associated with the second frequency.

9. The method of any of clauses 3-8, wherein determining the location of the mobile station comprises: determining an antenna phase center correction based on the antenna phase center offset difference data; and modifying the orbital assistance data based on the antenna phase center correction.

10. A mobile station configured to determine its location based on global navigation satellite system (GNSS) positioning signals comprising: a memory; a wireless transceiver configured to communicate through one or more wireless networks; one or more processors operably coupled to the wireless transceiver and the memory, the one or more processors configured to one or more processors operably coupled to the wireless transceiver and the memory, the one or more processors configured to: receive satellite positioning signals from a plurality of GNSS satellites; receive, from a server, an orbital assistance data, including orbital information for one or more GNSS satellites referenced to a respective antenna phase center for a first frequency of the satellite positioning signals; and determine the location of the mobile station based on the orbital assistance data and the satellite positioning signals.

11. The mobile station of clause 10, wherein the orbital assistance data is in an earth-centered earth-fixed (ECEF) frame of reference.

12. The mobile station of any of clauses 10-11, wherein the orbital assistance data comprises an antenna phase center offset difference data for one or more frequencies that differ from the first frequency for the one or more GNSS satellites, wherein the determination of the location of the mobile station further comprises the one or more processors configured to: select a second frequency of the satellite positioning signals; and determine the location of the mobile station using the second frequency of the satellite positioning signals and the antenna phase center offset difference data.

13. The mobile station of clause 12, wherein the antenna phase center offset difference data for the second frequency is in a radial, along-track, and cross-track frame of reference.

14. The mobile station of clause 13, wherein the determination of the location of the mobile station comprises using radial antenna phase center offset difference data and ignoring along-track and cross-track antenna phase center offset difference data.

15. The mobile station of any of clauses 12-14, wherein the antenna phase center offset difference data for each of the one or more frequencies is with respect to the first frequency.

16. The mobile station of any of clauses 12-15, wherein the antenna phase center offset difference data includes an offset distance between a first apparent source of radiation on an antenna of a GNSS satellite associated with the first frequency and a second apparent source of radiation on the antenna associated with the second frequency.

17. The mobile station of any of clauses 12-16, wherein the determination of the location of the mobile station further comprises the one or more processors configured to: determine an antenna phase center correction based on the antenna phase center offset difference data; and modify the orbital assistance data based on the antenna phase center correction.

18. A non-transitory computer-readable storage medium comprising instructions that, when executed by one or more processors of a mobile station, cause the mobile station to perform operations comprising: receiving satellite positioning signals from a plurality of global navigation satellite system (GNSS) satellites; receiving, from a server, an orbital assistance data, including orbital information for one or more GNSS satellites referenced to a respective antenna phase center for a first frequency of the satellite positioning signals; and determining a location of the mobile station based on the orbital assistance data and the satellite positioning signals.

19. The non-transitory computer-readable storage medium of clause 18, wherein the orbital assistance data is in an earth-centered earth-fixed (ECEF) frame of reference.

20. The non-transitory computer-readable storage medium of any of clauses 18-19, wherein the orbital assistance data comprises an antenna phase center offset difference data for one or more frequencies that differ from the first frequency for the one or more GNSS satellites, wherein determining the location of the mobile station further comprises: selecting a second frequency of the satellite positioning signals; and determining the location of the mobile station using the second frequency of the satellite positioning signals and the antenna phase center offset difference data.

21. The non-transitory computer-readable storage medium of clause 20, wherein the antenna phase center offset difference data for the second frequency is in a radial, along-track, and cross-track frame of reference.

22. The non-transitory computer-readable storage medium of clause 21, wherein determining the location of the mobile station comprises using radial antenna phase center offset difference data and ignoring along-track and cross-track antenna phase center offset difference data.

23. The non-transitory computer-readable storage medium of any of clauses 20-22, wherein the antenna phase center offset difference data for each of the one or more frequencies is with respect to the first frequency.

24. The non-transitory computer-readable storage medium of any of clauses 20-23, wherein the second frequency is different than the first frequency.

25. The non-transitory computer-readable storage medium of any of clauses 20-24, wherein the antenna phase center offset difference data includes an offset distance between a first apparent source of radiation on an antenna of a GNSS satellite associated with the first frequency and a second apparent source of radiation on the antenna associated with the second frequency.

26. The non-transitory computer-readable storage medium of any of clauses 20-25, wherein determining the location of the mobile station comprises: determining an antenna phase center correction based on the antenna phase center offset difference data; and modifying the orbital assistance data based on the antenna phase center correction.

27. A mobile station configured to determine its location based on global navigation satellite system (GNSS) positioning signals comprising: means for receiving satellite positioning signals from a plurality of global navigation satellite system (GNSS) satellites, means for receiving, from a server, an orbital assistance data, including orbital information for one or more GNSS satellites referenced to respective antenna phase center with respect to a first frequency; and means for determining the location of the mobile station based on the orbital assistance data and the satellite positioning signals.

28. The mobile station of clause 27, wherein the orbital assistance data comprises an antenna phase center offset difference data for one or more frequencies that differ from the first frequency for the one or more GNSS satellites, wherein determining the location of the mobile station further comprises: selecting a second frequency of the satellite positioning signals; and determining the location of the mobile station using the second frequency of the satellite positioning signals and the antenna phase center offset difference data.

29. The mobile station of any of clauses 27-28, wherein the antenna phase center offset difference data for the second frequency is in a radial, along-track, and cross-track frame of reference.

30. The mobile station of clause 29, wherein determining the location of the mobile station comprises using radial antenna phase center offset difference data and ignoring along-track and cross-track antenna phase center offset difference data.

Therefore, it is intended that claimed subject matter not be limited to the particular examples disclosed, but that such claimed subject matter may also include all aspects falling within the scope of appended claims, and equivalents thereof.

What is claimed is:

1. A method for determining a location of a mobile station using orbital assistance data, the method comprising:
   receiving satellite positioning signals from a plurality of global navigation satellite system (GNSS) satellites;
   receiving, from a server, the orbital assistance data, including orbital information for one or more GNSS satellites referenced to a respective antenna phase center for a first frequency of the satellite positioning signals, and antenna phase center offset difference data representative of a distance between a location on an antenna which is associated with the first frequency and a location on the antenna which is associated with a second frequency of the satellite positioning signals; and
   determining the location of the mobile station based on the orbital assistance data and the satellite positioning signals.

2. The method of claim 1, wherein the orbital assistance data is in an earth-centered earth-fixed (ECEF) frame of reference.

3. The method of claim 1, wherein the antenna phase center offset difference data is for one or more frequencies that differ from the first frequency for the one or more GNSS satellites, wherein determining the location of the mobile station further comprises:
   selecting a second frequency of the satellite positioning signals; and
   determining the location of the mobile station using the second frequency of the satellite positioning signals and the antenna phase center offset difference data.

4. The method of claim 3, wherein the antenna phase center offset difference data is in a radial, along-track, and cross-track frame of reference.

5. The method of claim 4, wherein determining the location of the mobile station comprises using radial antenna phase center offset difference data and ignoring along-track and cross-track antenna phase center offset difference data.

6. The method of claim 3, wherein the antenna phase center offset difference data for each of the one or more frequencies is with respect to the first frequency.

7. The method of claim 3, wherein the second frequency is different than the first frequency.

8. The method of claim 3, wherein the antenna phase center offset difference data includes an offset distance between a first apparent source of radiation on an antenna of a GNSS satellite associated with the first frequency and a second apparent source of radiation on the antenna associated with the second frequency.

9. The method of claim 3, further comprising:
   determining an antenna phase center correction based on the antenna phase center offset difference data.

10. A mobile station configured to determine its location based on global navigation satellite system (GNSS) positioning signals comprising:
    a memory;
    a wireless transceiver configured to communicate through one or more wireless networks;
    a receiver;
    one or more processors operably coupled to the wireless transceiver and the memory, the one or more processors configured to:
    receive, via the receiver, satellite positioning signals from a plurality of GNSS satellites;
    receive, from a server via the wireless transceiver, an orbital assistance data, including orbital information for one or more GNSS satellites referenced to a respective antenna phase center for a first frequency of the satellite positioning signals, and antenna phase center offset difference data representative of a distance between a location on an antenna which is associated with the first frequency and a location on the antenna which is associated with a second frequency of the satellite positioning signals; and
    determine the location of the mobile station based on the orbital assistance data and the satellite positioning signals.

11. The mobile station of claim 10, wherein the orbital assistance data is in an earth-centered earth-fixed (ECEF) frame of reference.

12. The mobile station of claim 10, wherein the antenna phase center offset difference data is for one or more frequencies that differ from the first frequency for the one or more GNSS satellites, wherein the determination of the location of the mobile station further comprises the one or more processors configured to:
    select a second frequency of the satellite positioning signals; and
    determine the location of the mobile station using the second frequency of the satellite positioning signals and the antenna phase center offset difference data.

13. The mobile station of claim 12, wherein the antenna phase center offset difference data is in a radial, along-track, and cross-track frame of reference.

14. The mobile station of claim 13, wherein the determination of the location of the mobile station comprises using radial antenna phase center offset difference data and ignoring along-track and cross-track antenna phase center offset difference data.

15. The mobile station of claim 12, wherein the antenna phase center offset difference data for each of the one or more frequencies is with respect to the first frequency.

16. The mobile station of claim 12, wherein the antenna phase center offset difference data includes an offset distance between a first apparent source of radiation on an antenna of a GNSS satellite associated with the first frequency and a second apparent source of radiation on the antenna associated with the second frequency.

17. The mobile station of claim 12, wherein the one or more processors configured to:
 determine an antenna phase center correction based on the antenna phase center offset difference data, wherein the determination of the location of the mobile station is based on the antenna phase center correction.

18. A mobile station configured to determine its location based on global navigation satellite system (GNSS) positioning signals comprising:
 means for receiving satellite positioning signals from a plurality of global navigation satellite system (GNSS) satellites;
 means for receiving an orbital assistance data, including orbital information for one or more GNSS satellites referenced to respective antenna phase center with respect to a first frequency of the satellite positioning signals, and antenna phase center offset difference data representative of a distance between a location on an antenna which is associated with the first frequency and a location on the antenna which is associated with a second frequency of the satellite positioning signals; and
 means for determining the location of the mobile station based on the orbital assistance data and the satellite positioning signals.

19. The mobile station of claim 18, wherein the orbital assistance data is in an earth-centered earth-fixed (ECEF) frame of reference.

20. The mobile station of claim 19, wherein the antenna phase center offset difference data is for one or more frequencies that differ from the first frequency for the one or more GNSS satellites, wherein determining the location of the mobile station further comprises:
 selecting a second frequency of the satellite positioning signals; and
 determining the location of the mobile station using the second frequency of the satellite positioning signals and the antenna phase center offset difference data.

21. The mobile station of claim 20, wherein the antenna phase center offset difference data is in a radial, along-track, and cross-track frame of reference.

22. The mobile station of claim 21, wherein the means for determining the location of the mobile station comprises means for using radial antenna phase center offset difference data and ignoring along-track and cross-track antenna phase center offset difference data.

23. The mobile station of claim 20, wherein the antenna phase center offset difference data for each of the one or more frequencies is with respect to the first frequency.

24. The mobile station of claim 20, wherein the second frequency is different than the first frequency.

25. The mobile station of claim 20, wherein the antenna phase center offset difference data includes an offset distance between a first apparent source of radiation on an antenna of a GNSS satellite associated with the first frequency and a second apparent source of radiation on the antenna associated with the second frequency.

26. The mobile station of claim 20, wherein the means for determining the location of the mobile station comprises:
 means for determining an antenna phase center correction based on the antenna phase center offset difference data, wherein the means for determining the location of the mobile station is based on the antenna phase center correction.

27. A non-transitory computer-readable storage medium comprising instructions are configured to, when executed by one or more processors of a mobile station, cause the mobile station to perform operations comprising:
 receiving satellite positioning signals from a plurality of global navigation satellite system (GNSS) satellites;
 receiving, from a server, an orbital assistance data, including orbital information for one or more GNSS satellites referenced to a respective antenna phase center for a first frequency of the satellite positioning signals, and antenna phase center offset difference data representative of a distance between a location on an antenna which is associated with the first frequency and a location on the antenna which is associated with a second frequency of the satellite positioning signals; and
 determining a location of the mobile station based on the orbital assistance data and the satellite positioning signals.

28. The non-transitory computer-readable storage medium of claim 27, wherein the antenna phase center offset difference data is for one or more frequencies that differ from the first frequency for the one or more GNSS satellites, wherein determining the location of the mobile station further comprises:
 selecting a second frequency of the satellite positioning signals; and
 determining the location of the mobile station using the second frequency of the satellite positioning signals and the antenna phase center offset difference data.

\* \* \* \* \*